US006179389B1

United States Patent
Freitag et al.

(10) Patent No.: US 6,179,389 B1
(45) Date of Patent: Jan. 30, 2001

(54) PUMP SYSTEM FOR GENERATING A BRAKE PRESSURE

(75) Inventors: Rainer Freitag, Owen; Armin Müller, Gechingen; Harry Tröster, Tamm; Michael Duvenbeck, Schonaich; Franz Ringer, Jettingen, all of (DE)

(73) Assignees: DaimlerChrysler AG, Stuttgart; MOOG GmbH, Böblingen, both of (DE)

( * ) Notice: Under 35 U.S.C. 154(b), the term of this patent shall be extended for 0 days.

(21) Appl. No.: 09/326,553

(22) Filed: Jun. 7, 1999

(30) Foreign Application Priority Data

Jun. 5, 1998 (DE) ................................. 198 25 204

(51) Int. Cl.⁷ ............................... B60T 8/00; B60T 8/32; B60T 8/48; B60T 13/18; B62D 5/07
(52) U.S. Cl. .............................. 303/2; 188/358; 180/422; 180/441; 303/10; 303/115.4; 303/3; 303/114.1; 303/113.4
(58) Field of Search ................... 303/10, 2, 3, 115.4, 303/115.5, 116.1–116.4, 188, 113.5, 114.1, 114.2, 15, 146, 155, 113.4, 147; 60/547.2, 547.3, 548, 547.1, 549, 560; 188/358, 359; 701/41, 42; 137/505.18; 180/441, 422, 406, 305, 400, 403, 421, 442, 443; 91/371, 378, 445, 44, 459, 462

(56) References Cited

U.S. PATENT DOCUMENTS 3,936,095 * 2/1976 Every ........................ 303/10
4,027,924 * 6/1977 Kondo ..................... 303/115.4
4,095,848 * 6/1978 Kondo ..................... 303/114.1
4,492,414 * 1/1985 Kozakai et al. ............. 303/10
4,624,508 * 11/1986 Adachi et al. .
4,838,621 * 6/1989 Furuta et al. ............. 303/114.1
5,549,361 * 8/1996 Sorensen ..................... 303/2
6,085,860 * 7/2000 Hackl et al. ............... 303/146

FOREIGN PATENT DOCUMENTS

| 2952281 | * | 7/1990 | (DE) . |
| 4015866 A1 | * | 11/1991 | (DE) . |
| 4335769 C1 | * | 12/1994 | (DE) . |
| 4420148 A1 | * | 12/1995 | (DE) . |
| 19549082 A1 | * | 7/1997 | (DE) . |
| 19640456 A1 | * | 4/1998 | (DE) . |

\* cited by examiner

Primary Examiner—Douglas C. Butler
(74) Attorney, Agent, or Firm—Evenson, McKeown, Edwards & Lenahan, P.L.L.C.

(57) ABSTRACT

A system generates a brake pressure with a pump which delivers a volume into the chamber of a master brake cylinder and builds up a pressure which is used by at least one additional assembly, particularly a power-assisted steering system. The system has at least one distributing and throttling element for admitting a definable pressure to the chamber of the master brake cylinder and/or the additional assembly. The one or more distributing and throttling elements can be triggered, as a function of the brake pedal position and/or of driving condition values and/or of operating values of the vehicle, such that the chamber and/or the additional unit can be acted upon by a pump generated adjustable pressure.

20 Claims, 2 Drawing Sheets

PUMP SYSTEM FOR GENERATING A BRAKE PRESSURE

BACKGROUND OF THE INVENTION

This application claims the priority of 198 25 204.8-21, filed Jun. 5, 1998, the disclosure of which is expressly incorporated by reference herein.

The present invention relates to a system for generating a brake pressure with a pump which delivers a volume into the master brake cylinder chamber and builds up a pressure which is used by at least one additional assembly, particularly a power-assisted steering system, and having at least one distributing and throttling element for admitting a definable pressure to the master brake cylinder chamber and/or the additional assembly.

DE 196 40 456 A1 shows a system in which a plurality of distributing and throttling elements is used. Thereby, the pressure in the chamber of the master brake cylinder and/or of the additional assembly can be distributed and adjusted. The triggering of these distributing and throttling elements requires relatively high control expenditures and is also susceptible to disturbances.

SUMMARY OF THE INVENTION

An object of the present invention is to provide an improved system for generating a brake pressure such that, while the control expenditures are minimal, an adjustment and a distribution of the brake pressure which is applied to the chamber of the master brake cylinder and to the additional assembly, can be implemented in a simple manner, which is not susceptible to disturbances and is adapted to the vehicle and the driving situation.

In a system for generating a brake pressure with a pump, this object has been achieved according to the present invention by providing that the at least one distributing and throttling element can be triggered as a function of the brake pedal position and/or of driving condition values and/or of operating values of the vehicle. Thus, the chamber and/or the additional assembly can be acted upon by an adjustable pressure which is pump generated.

The distributing and throttling element can be triggered as a function of the brake pedal position and/or of driving condition and/or operating values of the vehicle. Thereby, the chamber of the master brake cylinder and/or the additional assembly can be acted upon by an adjustable pressure generated by the pump, advantageously, as the result of supplying the brakes as well as the additional unit, for example, of a power-assisted steering system by the same pump. Not only the operational safety of the steering system and of the brake is increased but the pressures between the brake and the steering system can be distributed and adjusted such that driving-dynamic values can be influenced. Furthermore, the braking system and the steering system can be adapted in this manner to defined vehicle-specific or driver-specific configurations.

A particularly advantageous embodiment of the present invention provides that the distributing and throttling element comprises at least one controllable proportional valve through which the chamber and/or the additional assembly can be acted upon by an adjustable pressure.

In an advantageous embodiment, the distributing and throttling element is a 4/3-way proportional valve, in whose first switching position the additional assembly is connected unthrottled with the pump, and the chamber of the master brake cylinder is connected with a fluid storage tank; in whose second switching position, the chamber is connected with the pump in an unthrottled manner and the additional assembly is connected with the pump in a controllably throttled manner; and in whose third switching position, the additional assembly is connected with the pump in an unthrottled manner and the chamber of the master brake cylinder is connected with the fluid tank in a controllably throttled manner.

This controllably operable 4/3-way proportional valve makes possible virtually any pressure distribution between the vehicle brake and the additional assembly, for example, a power-assisted steering system.

In another advantageous embodiment, the distributing and throttling element comprises a 5/3-way valve, in whose first switching position, the chamber and the additional assembly can be acted upon by a pressure by way of a flow control valve in a throttled manner; in whose second switching position, only the additional assembly can be acted upon by pressure in an unthrottled manner; and in whose third switching position, the additional assembly and the chamber can be acted upon with pressure in an unthrottled manner; and in that, in the line leading to the chamber, a controllable 2/2-way flow control proportional valve is arranged whose outlet is connected with a fluid tank.

It is preferably provided that the delivery of the pump can be varied in a controlled manner as a function of the operating path of the master brake cylinder and/or of the extent of the operation of the additional assembly, preferably of the turning velocity of a steering wheel of the power-assisted steering system. As a result, a pressure increase or a pressure decrease can take place, if required, at the master brake cylinder and/or the additional assembly, i.e., the power-assisted steering system, without changing the switching position of the valves. The turning velocity or any other appropriate value can also be used to characterize the extent of the operation and thus the extent of the required pressure to be provided on the additional assembly, for example, the power-assisted steering system, in order to vary the delivery of the pump.

The other driving condition and/or operating values of the vehicle, as a function of which the controllably operable distributing and throttling element can be triggered, advantageously include the following values: Lateral wheel forces, normal wheel forces, the longitudinal or lateral inclination of the vehicle, the longitudinal or lateral acceleration of the vehicle, the aerodynamic drag, the lift forces and negative lifts of the vehicle, the load condition of the vehicle, and the driving forces at the driven wheels of the vehicle.

In order to achieve a variably adjustable intensification ratio between the pedal force or the pedal travel of the driver and the vehicle deceleration, another advantageous embodiment provides that, as the result of the controllably throttled introduction of volume delivered by the pump into the chamber of the master brake cylinder, the pedal force/travel deceleration characteristic of the vehicle is adjustable.

Still another advantageous embodiment provides that the brake force distribution can be adjusted as a function of a forward or reverse driving of the vehicle by way of throttled volume which can be controllably introduced into the chamber of the master brake cylinder. Also when the vehicle is reversing, a stable braking performance can be particularly advantageously ensured in this manner.

The triggering advantageously takes place by way of an electronic control unit so that the distributing and throttling element can be triggered as a function of the brake pedal position and of the additional operating values of the vehicle and of driving condition values.

It may advantageously be provided that the actual longitudinal vehicle deceleration can be supplied to the control unit and can be compared with other operating values of the vehicle and with driving condition values, particularly with the desired vehicle deceleration defined by the driver of the vehicle. In this manner, the braking performance of the vehicle can be made independent of disturbance variables, for example, of exterior forces acting upon the vehicle, such as the load condition, a trailer operation, a slope or gradient, headwind, and of interior forces, such as a coefficient of friction spreading of the brake linings or inaccuracies of the engine torque.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
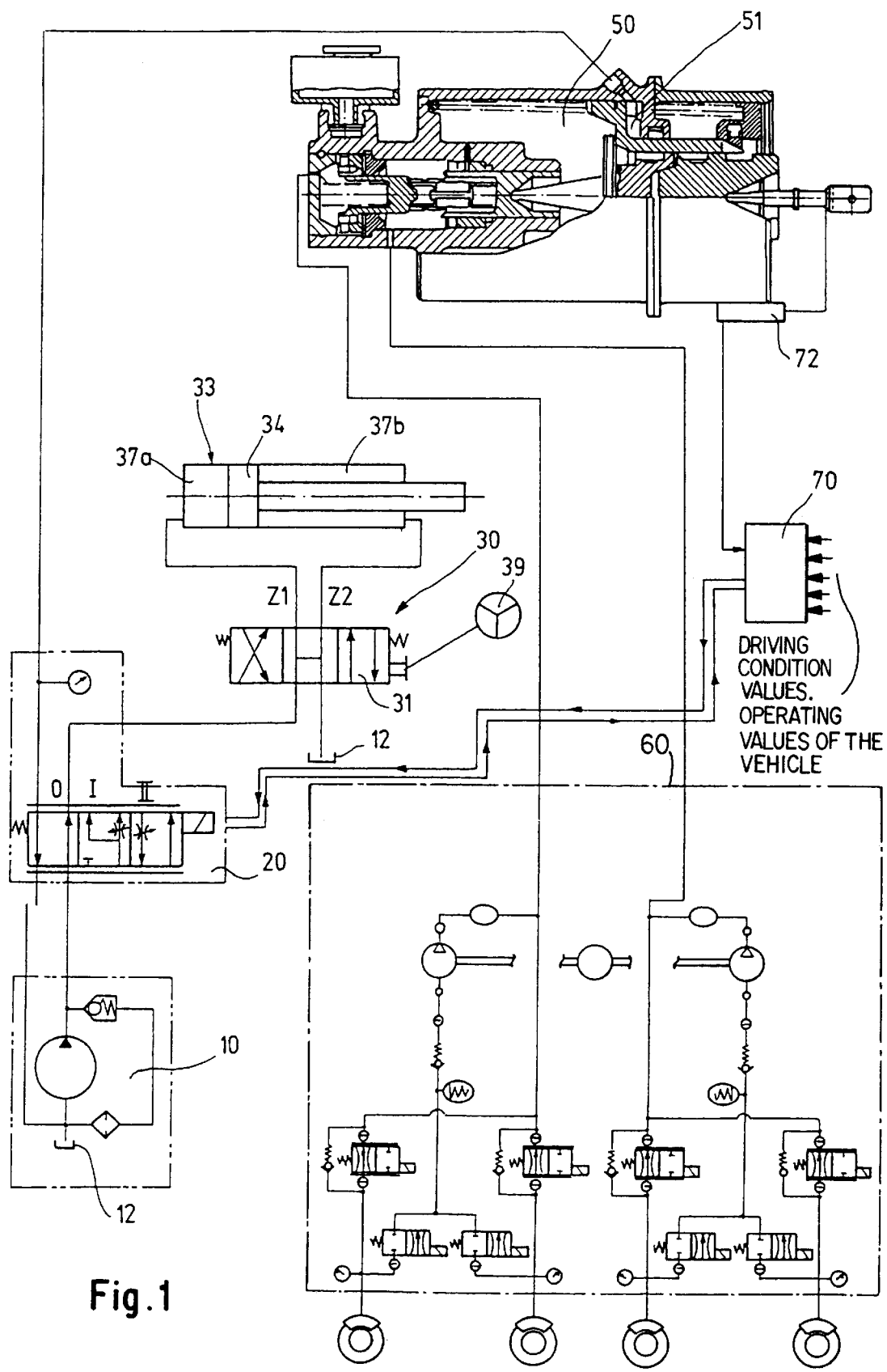
FIG. 1 is a schematic diagram of an embodiment of a system according to the present invention for generating a brake pressure with a pump.

An embodiment of a system for generating a brake pressure illustrated in FIG. 1 comprises a pump 10 which delivers fluid from a fluid reservoir 12. The delivery side of the pump 10 is connected with a connection of a triggerable 4/3-way proportional valve 20. Another connection of the 4/3-way proportional valve is connected with the fluid reservoir 12. Another connection of the 4/3-way proportional valve is connected with a 4/3-way valve 31 of another assembly 30. The other assembly can be a power-assisted steering system.

Another connection of the 4/3-way valve 31 of the additional assembly 30 is connected with the fluid reservoir 12. Two additional connections Z1, Z2 of the 4/3-way valve 31 of the power-assisted steering system 30 are connected with one chamber 37a, 37b respectively of a cylinder 33, with these chambers 37a, 37b being separated by a piston 34. A steering movement in the left or the right direction is assisted depending on which of the two chambers 37a, 37b receives fluid. Another connection of the 4/3-way proportional valve 20 is connected with the chamber 51 of a master brake cylinder 50.

In the neutral position 0, the 4/3-way proportional valve 31 of the power-assisted steering system 30 illustrated in FIG. 1 connects the delivery side of the pump with the fluid reservoir 12, and the suction side of the pump 10 is therefore short-circuited. A corresponding triggering of the 4/3-way valve 31 of the power-assisted steering system 30 connects one of the chambers 37a or 37b of the cylinder with the delivery side of the pump 10; the respective other chamber 37a or 37b is then connected by way of a return flow line 32 with the fluid reservoir 12. As a function of the triggering of the 4/3-way valve 31 of the power-assisted steering system 30, a steering movement initiated by a steering wheel 39 is therefore assisted in the left and the right direction.

When a brake pressure is required, the 4/3-way proportional valve 20 is switched by the triggering by way of a control unit 70 into its other switching position I. In this switching position I, the power-assisted steering system 30 is connected by way of an adjustable flow control element with the delivery side of the pump 10; whereas, the chamber 51 of the master brake cylinder 50 is connected in an unthrottled manner with the delivery side of the pump 10. By the variation of the flow control element by means of the control unit 70, the pressure is virtually "distributed" and adjusted between the master brake cylinder 50 and the power-assisted steering system 30.

The variation of the flow control element in the switching position I of the 4/3-way proportional valve 20 is carried out by the control unit 70 as a function of the pedal travel, which is detected by a sensor element 72 and is supplied to the control unit 70 and as a function of additional operating values of the vehicle and of driving condition values which are detected by additional (not shown) sensor elements. In this case, the outlet of the master brake cylinder 50 is connected with an ABS hydraulic unit which is known per se and which has valves which are modified in the sense of a proportional wheel pressure control, in order to make the braking pressure on the individual wheels adjustable.

In a further switching position II of the 4/3-way proportional valve 20, the chamber 51 of the master brake cylinder 50 is connected by way of a flow control element, which is controllably variable by the control unit 70, with the fluid reservoir 12. The power-assisted steering system is connected with the delivery outlet of the pump 10. In this condition, a steering function and a braking function can be carried out simultaneously. The adjustment of the flow control element is also carried out by the control unit 70 as a function of the brake pedal position which is defined by the driver and of additional operating values of the vehicle and of driving condition values.

The adjustment of the flow control elements of the 4/3-way proportional valve 20 in switching positions I and II is carried out such that a simultaneous braking and steering function exists. In particular, during the braking function, a sufficient amount of oil must be available at the power-assisted steering system 30. The switching position I is taken up when the vehicle is to be braked completely. As the result of the direction connection of the delivery side with the chamber 51 of the master brake cylinder, an oil quantity for the pressure buildup is provided in this driving condition. During this time, another slightly smaller oil quantity is provided in a throttled manner simultaneously to the power-assisted steering system 30. After the pressure buildup has been completed, the 4/3-way proportional valve 20 takes up, for example, the switching position illustrated in I, in which a desired brake pressure can be held, or the switching position II, in which the brake pressure is maintained by the connection of the chamber 51 of the master brake cylinder 50 with the fluid reservoir 12 by way of the variable flow control element, and simultaneously a sufficient oil quantity for the "steering" function is provided to the power-assisted steering system 30 by the direct connection with the delivery outlet of the pump 10.

Figure 2:
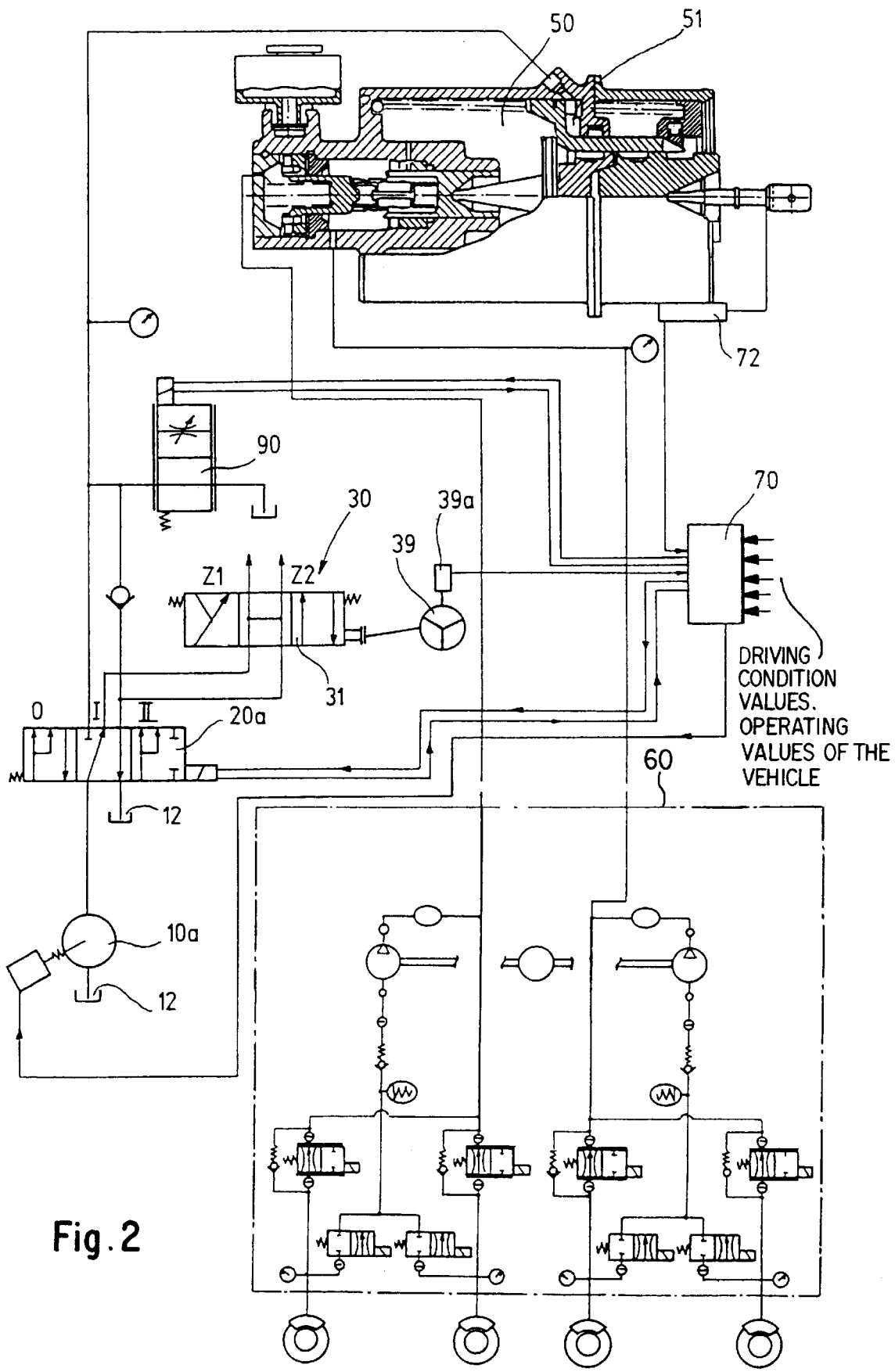
FIG. 2 is a schematic diagram of another embodiment of a system according to the present invention for generating a brake pressure with a pump.

In a second embodiment illustrated in FIG. 2, those structural elements which are identical to those of the embodiment illustrated in FIG. 1 have the same reference numbers so that with respect to their description reference is made to the full contents of the explanations of the FIG. 1 embodiment.

In contrast to the first embodiment, however the distributing and throttling element in the embodiment illustrated in FIG. 2 comprises a 5/3-way valve in whose switching step 0, the chamber 51 and the power-assisted steering system 30 can be acted upon by pressure by way of a flow control element. In the second position of the 5/3-way valve called I, in contrast, only the power-assisted steering system 30 is connected with a pump 10a. In a third position of the 5/3-way valve 20a called II, the power-assisted steering system 30 and the chamber 51 of the master brake cylinder 50 are acted upon with pressure in an unthrottled manner.

In a line leading to the chamber 51 of the master brake cylinder 50, a controllable 2/2-way flow control proportional valve 90 is also arranged. In addition to the sensor element 72, which detects the position of the piston of the master brake cylinder 50, a sensor 39a is provided which detects the turning velocity of the steering wheel 39. The signals of both sensors are supplied to a control unit 70 which emits an output signal for triggering and varying the delivery pump 10a.

The method of operation of the system is as follows: In position 0 of the 5/3-way valve 20a, a brake pressure is built up. A rough controlling takes place by the flow control element of the valve 20a and a precise controlling takes place by the 2/2-way flow control proportional valve 90. Thereby, precise control of the brake pressure can be apportioned in a fine manner. When the brake pressure is higher than the pressure in the power-assisted steering system 30, the valve 20a switches into position I. In contrast, position II has the purpose of maintaining the pressure in the brake and in the power-assisted steering system 30.

The 4/3-way proportional valve 20, can be triggered by the control unit 70. Likewise, the 5/3-way valve 20a and the 2/2 way flow control proportional valve 90, as a function of the pedal travel sensor and of other input quantities in connection with the hydraulic assembly 60, can advantageously also be triggered by the control unit 70.

A variably adjustable intensification ratio is conceivable between the pedal force or the pedal travel and the braking forces resulting from the hydraulic pressures in the wheel brakes and thus the vehicle deceleration. This can advantageously be utilized in connection with driver type classifications, driver-specific vehicle configurations as well as for the adaptation of the braking system to various braking arrangements and vehicles.

Furthermore, pedal force/travel deceleration characteristics which can be adjusted as a function of a forward drive, and a reversing drive can be implemented for an optimal apportioning capacity of the brakes. In particular, the brake force distribution can be switched over for a forward drive and a reversing drive. As a result, a stable braking performance can be ensured also during the reversing drive of the vehicle.

A dynamically optimal brake force distribution can be achieved by determining the lateral wheel forces required for a stable vehicle handling which are detected as input quantities by additional sensors. An adjustment of the brake forces can be carried out in the sense of a maximal utilization of the adhesion coefficient between the tire and the road. For this purpose, the wheel-individual normal forces in the wheel contact planes are computed while taking into account wheel and axle load displacements as the result of the longitudinal and lateral slope of the road, the longitudinal and lateral acceleration of the vehicle, the aerodynamic drag as well as the lift forces and the negative lift forces of the vehicle, including the diagonal flow against the vehicle and the load condition of the vehicle, this quantity being detected by (not shown) sensors or being computed from other quantities.

The normal forces of the wheel can be determined, for example, from measuring the spring forces and optionally the damper forces, as known from partially and fully active suspension systems. The loading condition can be detected, for example, by way of a level control system which is known per se and which operates, for example, on all axles. The determination of the adjustable braking forces on the driven wheels takes place by way of the driving forces. The control unit 70 can be linked with the electronic engine control and transmission control system of the vehicle.

A wheel-individual adaptation of the braking forces is also possible to driving dynamics control systems known from prior art, in which, for optimizing chassis systems, the wheel contact forces may be influenced by variable rolling moments, support during cornering and/or active deforming along the diagonal line of the vehicle. Such a driving dynamics control is fully described, for example, in DE 43 35 769 C1 which is incorporated by reference herein.

Furthermore, a determination of the coefficient of friction of the brake lining on the front and rear axle is within the scope of the present invention. The reason is that, when the brake is not operated, a vehicle deceleration takes place in the plane from the known quantities of the vehicle mass, the drag force, the rolling resistance and the driving force at the wheels. If the vehicle deceleration determined from the wheel speeds or measured directly is within an appropriately selected tolerance band, a conclusion can be drawn with respect to a driving in a plane. When the driver now wishes a certain desired braking deceleration, which he defines by adjusting the brake pedal, as the result of the exclusive operation of the front or rear axle brakes, the average coefficient of friction of the front or rear axle can be determined from the relationship between the measured wheel brake pressures and the occurring longitudinal vehicle deceleration. With a defined known average coefficient of friction of the brake lining of an axle, as a result, during braking with all four wheel brakes, the average coefficient of friction of the brake lining can also be determined.

An important point is also the desired deceleration desired by the driver which is defined by brake pedal position. By comparing the desired deceleration defined by the driver with the brake pedal position with the actual vehicle deceleration determined from the wheel speeds or measured in a suitable manner, and returning the deviation into a correspondingly designed controller, which is part of the control unit 70, the braking performance of the vehicle can be made independent of the disturbances in the form of exterior forces acting upon the vehicle, such as a load condition, a trailer operation, a slope or gradient, head wind, and of interior forces, such as spreading of the coefficient of friction of the brake linings or inaccuracies of the engine torque.

The above-described system can also be used in vehicles with electric or electrohybrid drives. All above-described operations can be implemented by changing the switching position of the 4/3-way proportional valve and of the flow control elements of this 4/3-way proportional valve, which can be triggered by the control unit 70, or by changing the switching positions of the 5/3-way valve 20a in connection with the 2/2-way flow control proportional valve 90.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for generating a brake pressure, comprising a master brake cylinder, a pump configured to deliver a volume into a chamber of the master brake cylinder and build up a pressure utilizable by at least one additional assembly, including a power-assisted steering system, and at least one distributing and throttling element configured to admit a definable pressure to at least one of the chamber of the master brake cylinder and the at least one additional assembly, wherein the at least one distributing and throttling element is configured to be triggerable as a function of at least one of brake pedal position, driving condition values and operating values of the vehicle, such that at least one of the chamber and the at least one additional unit is acted upon by an adjustable pressure generatable by the pump.

2. The system according to claim 1, wherein the distributing and throttling element comprises at least one controllable proportional valve through which the at least one of the chamber and the at least one additional assembly is acted upon by an adjustable pressure.

3. The system according to claim 1, wherein the distributing and throttling element is a controllably operable 4/3-way proportional valve having a first switching position in which the additional assembly is connected unthrottled with the pump, and the chamber of the master brake cylinder is connected with a fluid reservoir, a second switching position in which the chamber is connected unthrottled with the pump and the at least one additional assembly is controllably-throttled connected with the pump, and a third switching position in which the at least one additional assembly is connected unthrottled with the pump and the chamber of the master brake cylinder is controllable-throttled connected with the fluid reservoir.

4. The system according to claim 3, wherein the distributing and throttling element comprises at least one controllable proportional valve through which the at least one of the chamber and the at least one additional assembly is acted upon by an adjustable pressure.

5. The system according to claim 1, wherein the distributing and throttling element comprises a 5/3-way valve having a first switching position in which the chamber and the at least one additional assembly are acted upon by pressure by way of a flow control valve in a throttled manner, a second switching position in which the additional assembly are acted upon by pressure in an unthrottled manner, and a third switching position in which the at least additional assembly and the chamber are acted upon by pressure in an unthrottled manner, and, a controllable 2/2-way flow control proportional valve is arranged in a line leading to the chamber and has an outlet connected with a fluid reservoir.

6. The system according to claim 5, wherein the distributing and throttling element comprises at least one controllable proportional valve through which the at least one of the chamber and the at least one additional assembly is acted upon by an adjustable pressure.

7. The system according to claim 5, wherein a delivery of the pump is controllably variable as a function of operating path of the master brake cylinder and of an extent of operation of the at least one additional assembly, including a turning velocity of a steering wheel of the power-assisted steering system.

8. The system according to claim 1, wherein at least one of the driving condition values and operating values of the vehicle comprise at least one of values of lateral wheel forces, normal wheel forces, longitudinal or lateral inclination of the vehicle, longitudinal or lateral acceleration, aerodynamic drag, lift forces and negative lifts of the vehicle, load condition of the vehicle, driving forces at the driven wheels of the vehicle, and longitudinal deceleration of the vehicle.

9. The system according to claim 1, wherein the pump is configured such that a vehicle pedal force/travel deceleration characteristic is adjustable by the controllably throttled introduction of volume deliverable by the pump into the chamber of the master brake cylinder.

10. The system according to claim 1, wherein the master cylinder is arranged such that brake force distribution is adjustable by a throttled volume introduceable into the chamber of the master brake cylinder as a function of forward or reverse driving of a vehicle.

11. The system according to claim 1, wherein a control unit is operatively arranged to trigger the distributing and throttling element as a function of brake pedal position and of the additional operating values of the vehicle and of driving condition values.

12. The system according to claim 11, wherein actual longitudinal vehicle deceleration is supplied to the control unit and compared with other operating values of the vehicle and with driving condition values, including a desired vehicle deceleration defined by a vehicle driver.

13. The system according to claim 12, wherein the distributing and throttling element comprises at least one controllable proportional valve through which the at least one of the chamber and the at least one additional assembly is acted upon by an adjustable pressure.

14. The system according to claim 12, wherein the distributing and throttling element is a controllably operable 4/3-way proportional valve having a first switching position in which the additional assembly is connected unthrottled with the pump, and the chamber of the master brake cylinder is connected with a fluid reservoir, a second switching position in which the chamber is connected unthrottled with the pump and the at least one additional assembly is controllably-throttled connected with the pump, and a third switching position in which the at least one additional assembly is connected unthrottled with the pump and the chamber of the master brake cylinder is controllable-throttled connected with the fluid reservoir.

15. The system according to claim 12, wherein the distributing and throttling element comprises a 5/3-way valve having a first switching position in which the chamber and the at least one additional assembly are acted upon by pressure by way of a flow control valve in a throttled manner, a second switching position in which the additional assembly are acted upon by pressure in an unthrottled manner, and a third switching position in which the at least additional assembly and the chamber are acted upon by pressure in an unthrottled manner, and, a controllable 2/2-way flow control proportional valve is arranged in a line leading to the chamber and has an outlet connected with a fluid reservoir.

16. The system according to claim 12, wherein a delivery of the pump is controllably variable as a function of operating path of the master brake cylinder and of an extent of operation of the at least one additional assembly, including a turning velocity of a steering wheel of the power-assisted steering system.

17. The system according to claim 12, wherein at least one of the driving condition values and operating values of the vehicle comprise at least one of values of lateral wheel forces, normal wheel forces, longitudinal or lateral inclination of the vehicle, longitudinal or lateral acceleration, aerodynamic drag, lift forces and negative lifts of the vehicle, load condition of the vehicle, driving forces at the driven wheels of the vehicle, and longitudinal deceleration of the vehicle.

18. The system according to claim 12, wherein the pump is configured such that a vehicle pedal force/travel deceleration characteristic is adjustable by the controllably throttled introduction of volume deliverable by the pump into the chamber of the master brake cylinder.

19. The system according to claim 12, wherein the master cylinder is arranged such that brake force distribution is adjustable by a throttled volume introduceable into the chamber of the master brake cylinder as a function of forward or reverse driving of a vehicle.

20. The system according to claim 13, wherein the distributing and throttling element is a controllably operable 4/3-way proportional valve having a first switching position in which the additional assembly is connected unthrottled with the pump, and the chamber of the master brake cylinder is connected with a fluid reservoir, a second switching position in which the chamber is connected unthrottled with the pump and the at least one additional assembly is controllably-throttled connected with the pump, and a third switching position in which the at least one additional assembly is connected unthrottled with the pump and the chamber of the master brake cylinder is controllable-throttled connected with the fluid reservoir.

* * * * *